United States Patent [19]

Kuna et al.

[11] Patent Number: 4,729,564
[45] Date of Patent: Mar. 8, 1988

[54] CARD READING RESPONSIVE ELECTRONIC GAME

[75] Inventors: Wayne A. Kuna, River Forest; Jeffrey D. Breslow, Highland Park, both of Ill.

[73] Assignee: Marvin Glass & Associates, Chicago, Ill.

[21] Appl. No.: 827,346

[22] Filed: Feb. 7, 1986

[51] Int. Cl.$^4$ ............................ A63F 1/00; G09B 7/06
[52] U.S. Cl. .................................. 273/1 E; 434/311; 434/335; 340/784
[58] Field of Search ............... 434/308, 311, 169, 316, 434/171, 340, 343, 335; 340/784, 785, 806; 381/48; 273/1 E, 1 GC, 85 G, 85 CP, DIG. 28, 138 A

[56] References Cited

U.S. PATENT DOCUMENTS

| | | | |
|---|---|---|---|
| 2,041,589 | 5/1936 | Bowers | 340/806 |
| 4,104,625 | 8/1978 | Bristow et al. | 273/DIG. 28 |
| 4,333,152 | 6/1982 | Best | 273/DIG. 28 |
| 4,425,099 | 1/1984 | Naden | 434/311 |
| 4,435,164 | 3/1964 | Weber | 434/343 |
| 4,457,719 | 7/1984 | Dittakavi et al. | 434/169 |
| 4,542,903 | 9/1985 | Yokoi et al. | 273/1 GC |

Primary Examiner—Richard C. Pinkham
Assistant Examiner—MaryAnn Stoll Lastova
Attorney, Agent, or Firm—John S. Pacocha

[57] ABSTRACT

A microprocessor controlled game having an optical sensor for reading bar codes on cards. The cards visually depict a combination of number, size, color and shape that is represented by the bar code. Instructions and responses with respect to player card selection are indicated by a synthesized voice chip coordinated with a liquid crystal display facial caricature.

14 Claims, 4 Drawing Figures

CARD READING RESPONSIVE ELECTRONIC GAME

BACKGROUND OF THE INVENTION

1. Field of the Invention

This invention relates generally to games and more particularly to electronic games.

2. Background Art

Electronic games in which players interact with a microprocessor controlled game are old in the art. One example of such a prior art game is the "SIMON" game disclosed in U.S. Pat. No. 4,207,087.

SUMMARY OF THE INVENTION

The present invention is concerned with providing a game that interacts with a large variety of visual matter. This and other objects and advantages of the invention are achieved in a microprocessor controlled game having an optical sensor for reading bar codes on cards. The game device supplies audio instructions and responses plus coordinated caricature expressions.

BRIEF DESCRIPTION OF THE DRAWINGS

For a better understanding of the present invention, reference may be had to the accompanying drawings in which.

DETAILED DESCRIPTION OF THE PREFERRED EMBODIMENT

Figure 1:
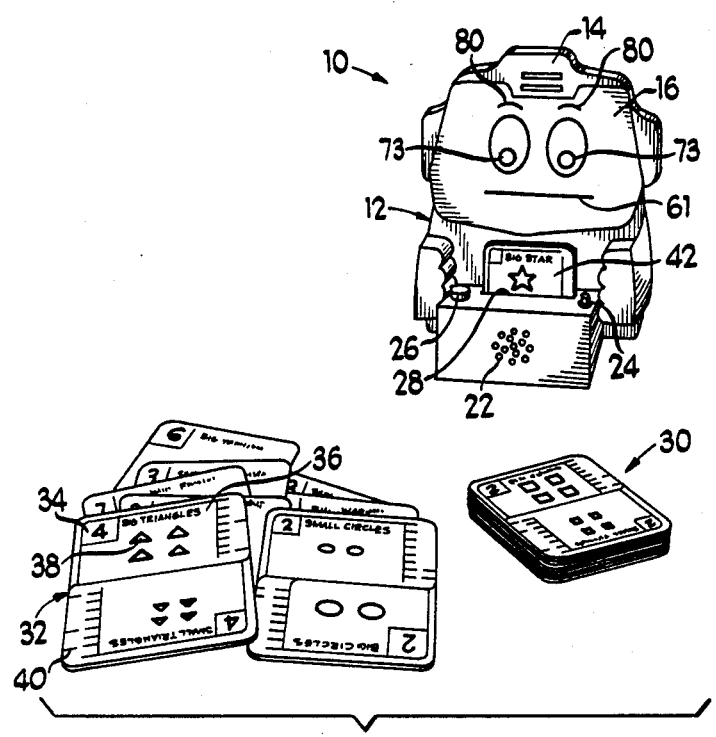
FIG. 1 is a perspective view of an embodiment of the present invention.
Figure 2:
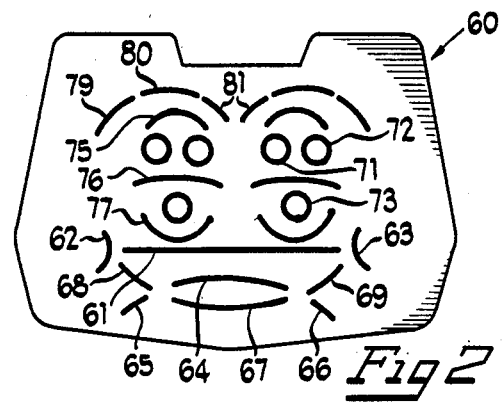
FIG. 2 is a front elevational view of the master liquid crystal display for the facial caricature.

Referring now to the drawings in which like parts are designated by like reference numerals throughout the several views, FIG. 1 shows a game 10 embodying the present invention. The game has a housing 12, a portion of which is styled to represent a head 14 of a character. Disposed within head 14 is a liquid crystal display face 16. Within housing 12 are electronic components 20 including a speaker 22. On the outside of the housing there is an on/off switch 24 and a rotatable volume control knob 26. A slot 28 is provided for insertion into the housing of one of cards 30 supplied with the game.

Each card 30 bears visual indicia depicting a combination of number, size, color and shape. Card 32, for example, has a numeral 34 in one corner with the number repeated in word form below the numeral, a word description 36 of the size and shape along the upper edge and a graphic showing 38 of the size and shape. A seven bar code 40, which identifies the particular combination of number, size, color and shape shown on the card, appears along one side edge of the card. One hundred twenty eight of such combinations may be represented with the seven bar code.

As illustrated in FIG. 1, when a card, such as 32, is inserted into slot 28, approximately one-half of the card remains exposed. Accordingly, each card may, to reduce the total number of cards needed, have an upper portion showing one combination and a reversely oriented lower portion showing another combination. Including combinations of the same number, color and shape on the same card face with the big and small sizes on the reversely oriented portions provides the child with a ready comparison of the size difference.

Figure 3:
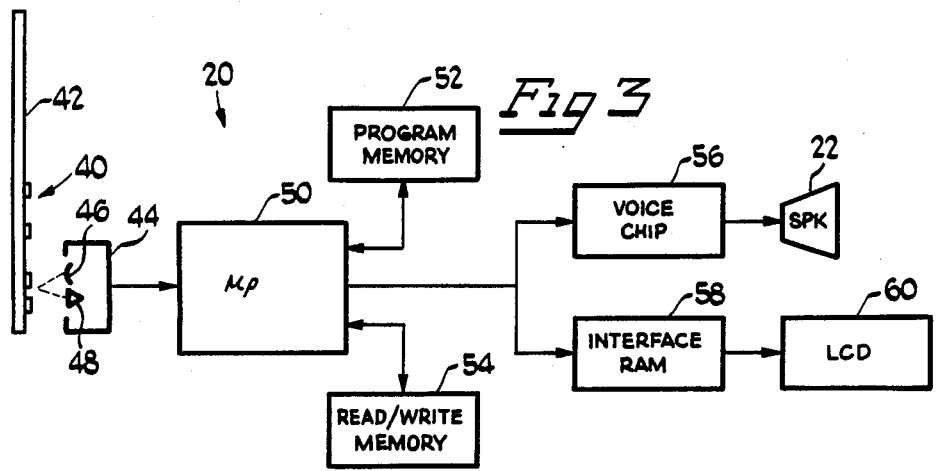
FIG. 3 is a block diagram of the electrical components.

Exemplary electronic components 20 illustrated in FIG. 3 include a reflected light optical sensor or bar code reader 44 which may include a light emitting diode 46 and a photo diode with a Darlington amplifier 48. As a card is inserted into slot 28, optical sensor 44 reads the bar code 40 and transmits a pulse to a microprocessor 50. The microprocessor includes a nonvolatile program memory 52 and a read/write memory 54. Program memory 52 stores the basic game and response programs. Read/write memory 54 stores current game information such as the number of players, which player's turn it is to respond, and the pending requests by the game device. Microprocessor 50 is connected to a voice chip 56 and an interface RAM 58. Voice chip 56 includes an amplifier and receives addresses directly from the microprocessor to synthesize requests and responses contained in the chip's vocabulary through speaker 22. Interface 58 includes input/output binary information for energizing the various segments in liquid crystal display 60 for face 16.

Liquid crystal display 60 includes a number of separate segments, the programmed actuation of which provides an animated caricature. Thus, there are nine segments, 61 through 69, to represent a mouth for face 16. For one particular expression, the single straight line segment 61 may be actuated as illustrated in the expression of FIG. 1. For a sad mouth expression, segments 64, 65 and 66 may be actuated. An open mouth is expressed by actuating segments 64 and 67. Similarly, there are three separate pupil segments 71, 72 and 73, for each of the caricature's eyes. An upper curved segment 75, an intermediate segment 76 and a lower curved segment 77 are used for various eyelid positions. Three segments 79, 80 and 81 of an arc are used for each eyebrow. It will be apparent to those skilled in the art that a large number of facial caricature expressions may be depicted by actuating various combinations of the segments.

Figure 4:
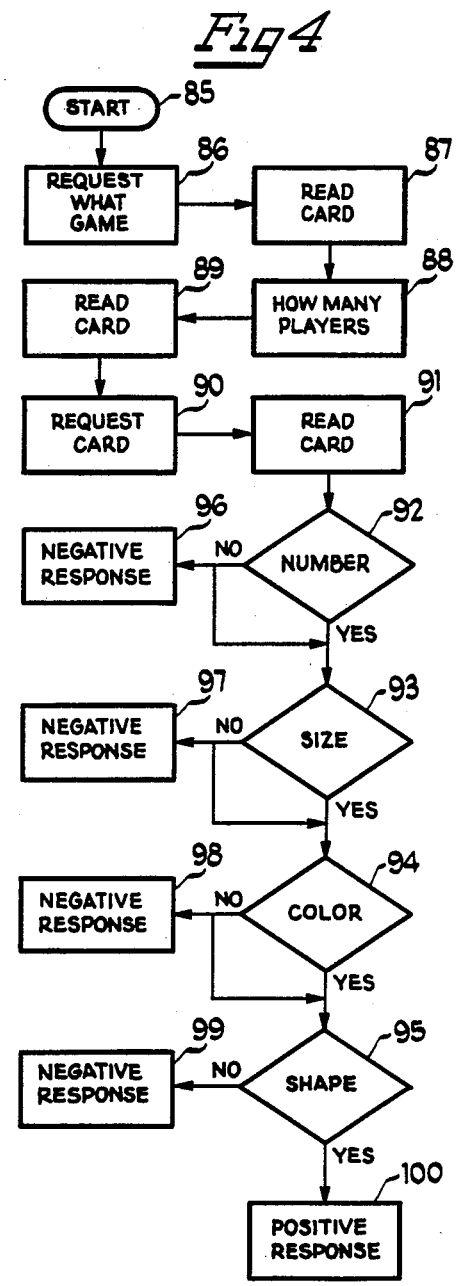
FIG. 4 is a flow chart illustrating the functions performed by the microprocessor.

Referring now to the flow chart of FIG. 4, when on/off switch 24 starts the game at 85, a request 86 is first made as to what game is to be played. For the purpose of instructing the game device on the selected game, a special set of cards (not shown) identifying each game and having an appropriate bar code indication 40 along one edge are provided. The player inserts the card for the selected game into slot 28. Upon reading the game card at 87, the device next queries how many players, as represented by 88 in the flow chart. Appropriate cards (not shown), again designating by a code 40, "ONE PLAYER", "TWO PLAYERS", "THREE PLAYERS", or "FOUR PLAYERS" is inserted into the slot and the microprocessor receives that information at 89.

Depending upon the game selected, and perhaps the number of players, a request 90 is made for a card and the player selects and inserts a card into the slot. The player's answer to the request is read at 91. Thereafter, the number, size, color and shape indicated by the bar code is checked against the request at 92, 93, 94 and 95, respectively. If the card read at 91 is incorrect in any one or more of the four parameters, an appropriate negative response is made at one of the 96, 97, 98 and/or 99. Should the card read at 91 be correct in each of the parameters then an appropriate positive response 100 is made.

A vocabulary of numbers, size descriptions, colors and shapes are included on the voice chip sufficient to request each of cards 30. Voice chip 56 also includes vocabulary phrases for the beginning of the game such as the following:

"Please show me what game"; and
"Please show me how many players".

Response phrases may be such as:
"Very good";
"Terrific";
"Nice going"; and
"Thank you".

These same responses may be used for positive response 100 to a correct answer. With read/write memory 54 keeping track of what player is responding, the number of the player may be used in conjunction with one or more response phrases as for example, "Very good, player 1, nice going". Negative responses may repeat the initial request, or may more particularly point out whether the error was in number, size, color or shape, as for example, "Sorry, player 1, not ___, I said . . ."

In one game, which may be played in a solitaire fashion or serially with other players, a request is made at 90 for a particular number, size, color and shape. The child then looks for a card depicting the orally requested parameters and inserts the chosen card into slot 28. Immediate acknowledgment of the correctness of the choice, or in what respect the choice is in error, helps the child to learn various numbers, sizes, colors and shapes.

Another game can be played in which cards 30 are either distributed among the players or spread out in a common display and the request for a particular card is directed to all of the players. In one such variation, if the cards have been dealt among the players, a player may insert a card from the player's hand if the player believes it to be the requested one. Should the player be in error, the player will pick another card from a common pile. With all of the cards distributed in a common central display, each player races to pick the requested card.

Additional games may be programmed in memory 52 including one in which a request is made for a card complying with only one of the parameters. Thus, a request may be made for a particular color and each player may then, in turn, insert a card having the requested color in the slot. If an incorrect color card is inserted, the player must take another card from a common pile. The first player to eliminate all of the cards in the player's hand wins.

A math game program may also be incorporated in the game. In such a variation, the request may be made to, for example, "Please show me two big circles plus three big circles". In response, the player must insert a card showing five big circles to obtain the positive response.

Many other games based on recognition of visual indicia may be played with the invention. While a particular embodiment has been shown and described with some variations, numerous other variations, changes and modifications will occur to those skilled in the art. It is intended in the appended claims to cover all such variations, changes and modifications as fall within the true spirit and scope of the present invention.

What is claimed as new and desired to be secured by Letters Patent is:

1. An electronic game comprising:
cards, each bearing visual indicia of a combination of parameters;
each card having a bar code indication of the combination of parameters depicted by the visual indicia;
each card having a face bearing reversely oriented portions with each portion having a different combination of the parameters;
a housing having a slot into which one of the cards may be inserted;
optical sensing means within the housing for reading the bar code on the inserted card;
the housing including means for making a request and indicating a response;
means cooperating with the optical sensing means for determining whether a correct card has been inserted in the slot in answer to a request; and
means directing a response based on the determination.

2. The game of claim 1 in which the request making and response indicating means includes a liquid crystal display facial caricature.

3. The game of claim 2 in which the liquid crystal display facial caricature has at least three separate mouth segments, at least two separate pupil segments for each of two separate eyes, at least two separate eyelid segments for each of the two separate eyes, and at least two separate eyebrow segments for each of the two separate eyes.

4. The game of claim 2 in which the liquid crystal display facial caricature has at least nine separate mouth segments, at least three separate pupil segments for each of two separate eyes, at least three separate eyelid segments for each of the two separate eyes, and at least three separate eyebrow segments for each of the two separate eyes.

5. The game of claim 1 in which the request making and response indicating means includes a synthesized voice chip.

6. The game of claim 1 in which the request making and response indicating means includes a synthesized voice chip and a liquid crystal display facial caricature.

7. The game of claim 6 including means coordinating the voice chip and the liquid crystal display facial caricature.

8. An electronic game comprising:
cards, each bearing visual indicia of a combination of number, size, color and shape parameters;
each card having a bar code indication of the combination of parameters depicted by the visual indicia;
a housing having a slot into which one of the cards may be inserted;
optical sensing means within the housing for reading the bar code on the inserted card;
the housing including means for making a request and indicating a response;
means cooperating with the optical sensing means for determining whether a correct card has been inserted in the slot in answer to a request; and
means directing a response based on the determination.

9. The game of claim 8 in which the request making and response indicating means includes a liquid crystal display facial caricature.

10. The game of claim 9 in which the liquid crystal display facial caricature has at least three separate mouth segments, at least two separate pupil segments for each of two separate eyes, at least two separate eyelid segments for each of the two separate eyes, and at least two separate eyebrow segments for each of the two separate eyes.

11. The game of claim 9 in which the liquid crystal display facial caricature has at least nine separate mouth segments, at least three separate pupil segments for each of two separate eyes, at least three separate eyelid segments for each of the two separate eyes, and at least three separate eyebrow segments for each of the two separate eyes.

12. The game of claim 8 in which the request making and response indicating means includes a synthesized voice chip.

13. The game of claim 8 in which the request making and response indicating means includes a synthesized voice chip and a liquid crystal display facial caricature.

14. The game of claim 13 including means coordinating the voice chip and the liquid crystal display facial caricature.

* * * * *